United States Patent Office 2,848,513
Patented Aug. 19, 1958

2,848,513

PREPARATION OF HYDRINDACENES

Louis Schmerling, Riverside, Ill., assignor to Universal Oil Products Company, Des Plaines, Ill., a corporation of Delaware No Drawing. Application October 10, 1955
Serial No. 539,648

17 Claims. (Cl. 260—668)

This invention relates to a process for preparing novel compositions of matter and particularly to a method for preparing alkyl substituted polynuclear hydrocarbons. More particularly the invention relates to a method for preparing alkyl substituted hydrindacenes.

It is an object of this invention to provide a method for preparing novel compositions of matter comprising alkyl substituted hydrindacenes.

A further object of this invention is to provide a method for preparing novel compositions of matter comprising alkyl substituted hydrindacenes, said process being carried out in the presence of a protonic acid catalyst.

One embodiment of this invention resides in a process for the preparation of a substituted polynuclear hydrocarbon by treating an aromatic hydrocarbon containing at least two pairs of unsubstituted adjacent carbon atoms separated by at least one carbon atom with a monohydrohalide of a conjugated diene, in which at least one of the doubly bonded carbon atoms is a tertiary carbon atom, in the presence of a protonic acid catalyst, and recovering the resultant polynuclear hydrocarbon.

A further embodiment of the invention is found in a process for preparing a substituted polynuclear hydrocarbon by treating an aromatic hydrocarbon containing at least two pairs of unsubstituted adjacent carbon atoms separated by at least one carbon atom with a monohydrohalide of a conjugated diene, in which at least one of the doubly bonded carbon atoms is a tertiary carbon atom, in the presence of a concentrated sulfuric acid catalyst, and recovering the resultant substituted polynuclear hydrocarbon.

A specific embodiment of the invention is found in a process for the preparation of 1,1,5,5-tetramethylhydrindacene by treating benzene with 3-chloro-3-methyl-1-butene in the presence of a catalyst consisting of concentrated sulfuric acid at a temperature in the range of from about 0° to about +35° C., and recovering the resultant 1,1,5,5-tetramethylhydrindacene.

Another specific embodiment of the invention is found in a process for preparing 1,1,5,5-tetramethylhydrindacene by treating benzene with 3-chloro-3-methyl-1-butene in the presence of a solvent consisting of methylcyclohexane and a catalyst consisting of concentrated sulfuric acid at a temperature in the range of from about 0° to about +35° C., and recovering the resultant 1,1,5,5-tetramethylhydrindacene.

Other objects and embodiments referring to alternative aromatic hydrocarbons and to alternative monohydrohalides of conjugated dienes in which at least one of the doubly bonded carbon atoms is a tertiary carbon atom will be found in the following further detailed description of the invention.

It has now been discovered that alkyl substituted polynuclear hydrocarbons such as alkyl substituted hydrindacenes may be prepared by treating an aromatic hydrocarbon containing at least two pairs of unsubstituted adjacent carbon atoms separated by at least one carbon atom with a monohydrohalide of a conjugated diene, in which at least one of the doubly bonded carbon atoms is a tertiary carbon atom, in the presence of a protonic acid catalyst. The products thus prepared are useful as intermediates for the preparation of other organic compounds such as pharmaceuticals, oxidation inhibitors, detergents, etc. For example, when an aromatic hydrocarbon such as benzene is treated with a monohydrohalide of a conjugated diene such as 3-chloro-3-methyl-1-butene in the presence of a protonic acid catalyst, and alkyl substituted hydrindacene such as 1,1,5,5-tetramethylhydrindacene is formed. This compound may then be converted to 4-hydroxy-1,1,5,5-tetramethylhydrindacene and 4,8-dihydroxy-1,1,5,5-tetramethylhydrindacene by hydrolysis of the sulfonic acid which was formed by sulfonation or by reaction of the diazonium compounds formed from the amines obtained by the reduction of the nitro derivatives, which in turn were formed by nitration of the alkyl substituted hydrindacene. The 4-hydroxy- and 4,8-dihydroxy-1,1,5,5-tetramethylhydrindacenes which are thus obtained show marked activity as oxidation inhibitors.

Aromatic hydrocarbons which may be used in this invention are those which contain at least two pairs of unsubstituted adjacent carbon atoms separated by at least one carbon atom. These include benzene, toluene, ethylbenzene, propylbenzene, butylbenzene, etc., p-xylene, p-diethylbenzene, p-dipropylbenzene, etc., naphthalene, α-methylnaphthalene, β-methylnaphthalene, α-ethylnaphthalene, β-ethylnaphthalene, α-propylnaphthalene, β-propylnaphthalene, etc., anthracene, α-methylanthracene, β-methylanthracene, γ-methylanthracene, α-ethylanthracene, β-ethylanthracene, γ-ethylanthracene, etc., phenanthrene, 1-methylphenanthrene, 2-methylphenanthrene, 3-methylphenanthrene, 1-ethylphenanthrene, 2-ethylphenanthrene, 3-ethylphenanthrene, etc., chrysene, 1-methylchrysene, 2-methylchrysene, 3-methylchrysene, 1-ethylchrysene, 2-ethylchrysene, 3-ethylchrysene, etc., pyrene, 1-methylpyrene, 2-methylpyrene, 2,7-dimethylpyrene, 1-ethylpyrene, 2-ethylpyrene, 3-ethylpyrene, 2,7-diethylpyrene, etc. Naphthalene and the other polynuclear hydrocarbons yield reaction products which are analogs of hydrindacene.

The above enumerated aromatic hydrocarbons are treated with a monohydrohalide of a conjugated diene in which at least one of the doubly bonded carbon atoms is a tertiary carbon atom. These monohydrohalides can have either the formula:

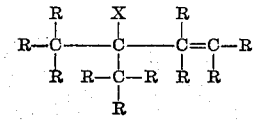

or

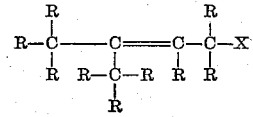

in which R is independently selected from either hydrogen or alkyl radicals and X is a halogen. The preferred halogens are chlorine and bromine. Monohydrohalides falling within the above formulae include 1-chloro-3-methyl-2-butene, 1-chloro-3-ethyl-2-butene, 1-chloro-2,3-dimethyl-2-butene, 1-chloro-2,3-diethyl-2-butene, 1-bromo-3-methyl-2-butene, 1-bromo-3-ethyl-2-butene, 1-bromo-2,3-dimethyl-2-butene, 1-bromo-2,3-diethyl-2-butene, 1-chloro-3-methyl-2-pentene, 1-chloro-3-ethyl-2-pentene, 1-chloro-2,3-dimethyl-2-pentene, 1-chloro-2,3-diethyl-2-pentene, 1-chloro-2-methyl-3-ethyl-2-pentene, 1-bromo-3-methyl-2- pentene, 1-bromo-3-ethyl-2-pentene, 1-bromo-2,3-dimethyl-2-pentene, 1-bromo-2,3-diethyl-2-pentene, 1-bromo-2-methyl-3-ethyl-2-pentene, 3-chloro-3-methyl-1-butene, 3-chloro-3-ethyl-1-butene, 3-chloro-2,3-dimethyl-1-butene, 3-chloro-2,3-diethyl-1-butene, 3-chloro-2-methyl-3-ethyl-1-butene, 3-bromo-3-methyl-1-butene, 3-bromo-3-ethyl-1-butene, 3-bromo-2,3-dimethyl-1-butene, 3-bromo-2,3-diethyl-1-butene, 3-bromo-2-methyl-3-ethyl-1-butene, 3-chloro-3-methyl-1-pentene, 3-chloro-3-ethyl-1-pentene, 3-chloro-2,3-dimethyl-1-pentene, 3-chloro-2,3-diethyl-1-pentene, 3-chloro-2-methyl-3-ethyl-1-pentene, 3-bromo-3-methyl-1-pentene, 3-bromo-3-ethyl-1-pentene, 3-bromo-2,3-dimethyl-1-pentene, 3-bromo-2,3-diethyl-1-pentene, 3-bromo-2-methyl-3-ethyl-1-pentene, 3-chloro-3-methyl-2-hexane, 3-chloro-3-ethyl-2-hexane, 3-chloro-2,3-dimethyl-2-hexane, 3-chloro-2,3-diethyl-2-hexane, 3-chloro-2-methyl-3-ethyl-2-hexane, 3-bromo-3-methyl-2-hexane, 3-bromo-3-ethyl-2-hexane, 3-bromo-2,3-dimethyl-2-hexane, 3-bromo-2,3-diethyl-2-hexane, 3-bromo-2-methyl-3-ethyl-2-hexane, etc. It is understood that the above mentioned monohydrohalides of a conjugated diene, in which at least one of the doubly bonded carbon atoms is a tertiary carbon atom, are only representatives of the class of compounds which may be used in this invention, and that said invention is not necessarily limited thereto.

The process of this invention is carried out in the presence of a protonic acid alkylation catalyst. Examples of protonic acids which may be used include concentrated sulfuric acid, hydrogen fluoride, phosphoric acid, silica-alumina composites, etc. In addition, if so desired, the reaction may be carried out in the presence of a saturated hydrocarbon. These saturated hydrocarbons include paraffins and cycloparaffins containing a tertiary carbon atom as well as compounds which may be isomerized to such tertiary carbon atom containing hydrocarbons under the conditions of the reaction. Examples of these hydrocarbons include n-pentane, isopentane, n-hexane, isohexane, etc., cyclohexane, methylcyclopentane, ethylcyclopentane, propylcyclopentane, methylcyclohexane, ethylcyclohexane, 1,2-dimethylcyclopentane, 1,2-diethylcyclopentane, 1,2-dimethylcyclohexane, 1,2-diethylcyclohexane, 1,4-diethylcyclohexane, etc. The process of this invention may be carried out at relatively low temperatures, said temperatures being in the range of from about 0° to about +35° C. when sulfuric acid or hydrogen fluoride is used as a catalyst, and from about 25° to about 200° C. when phosphoric acid is used as a catalyst. Even higher temperatures may be used with weakly acidic catalysts such as the silica-alumina composites.

The process of this invention may be effected in any suitable manner and may comprise either a batch or continuous type operation. When a batch type operation is used a quantity of the starting materials, namely the aromatic hydrocarbon and the monohydrohalide of a conjugated diene, in which at least one of the doubly bonded carbon atoms is a tertiary carbon atom, are added to a stirred mixture of the aromatic hydrocarbon, a catalyst, and if so desired a saturated hydrocarbon, in a suitable alkylating vessel. The vessel is maintained at the desired low temperature when sulfuric acid or hydrogen fluoride is used as a catalyst until the addition of the reactants is completed after which the temperature is allowed to rise to the upper limits hereinbefore stated, meanwhile continuously agitating the reaction mixture. After a predetermined residence time has elapsed the reaction product is separated from the unreacted starting materials by conventional means, for example, by washing, drying and fractional distillation, at atmospheric or reduced pressure. Purification of the reaction product may then be effected by redistillation or by recrystallization from organic solvents such as alcohols, ethers, etc.

Another method of operation of the present process is of the continuous type. In this process the starting materials are continuously introduced into a reaction zone which is maintained at the proper operating conditions of temperature and pressure. The reaction zone may comprise an unlined vessel or coil or may contain an adsorbent packing material such as fire brick, alumina, dehydrated bauxite and the like. The starting materials may be continuously introduced into the vessel by separate means or may be previously admixed outside the vessel and the resulting mixture introduced into the vessel in a single stream. The catalyst, comprising a protonic acid, is also introduced into said reactor through separate means as is the organic solvent or diluent consisting of a saturated hydrocarbon. At the end of the desired residence time the reaction product will be continuously withdrawn from the reaction zone and separated from the catalyst, saturated hydrocarbon, unreacted aromatic hydrocarbons and monohydrohalides of conjugated dienes, the latter two compounds being recycled for reuse as a portion of the starting materials while the reaction product consisting of substituted hydrindacenes are withdrawn and purified by the conventional means hereinbefore set forth.

Examples of compounds which may be prepared according to this reaction and which comprises new compositions of matter include 1,1,5,5-tetramethylhydrindacene, 1,1,5,5-tetraethylhydrindacene, 1,1,5,5-tetrapropylhydrindacene, 1,1,4,5,5-pentamethylhydrindacene, 1,1,5,5-tetramethyl-4-ethylhydrindacene, 1,1,5,5-tetramethyl-4,8-diethylhydrindacene, 1,1,4,5,5,8-hexamethylhydrindacene, 1,1,3,3,5,5,7,7-octamethylhydrindacene, etc.

The following examples are given to illustrate the process of this invention which, however, are not intended to limit the generally broad scope of the present invention in strict accordance therewith.

Example I

A solution of 25 g. (0.25 mole) of 1-chloro-3-methyl-2-butene in 20 g. of benzene was gradually added to a stirred mixture of a solution of 80 g. of benzene and 100 g. of concentrated sulfuric acid at a temperature of 4° C. during a period of 1.3 hours. The temperature of the flask was maintained in the range of from about 4° to about 6° C. while the mixture was continuously stirred for an additional hour. At the end of this time the upper layer totalling 114 g. was separated from the lower catalyst layer (111 g.), washed with water, dried and subjected to fractional distillation. A cut boiling at 105° C. at 3 mm. pressure was separated out. The material of the cut was partly crystalline. The mixture was filtered yielding a crystalline material comprising 1,1,5,5-tetramethylhydrindacene having a melting point of 90–91° C.

Example II

A solution of 25 g. (0.25 mole) of 3-chloro-3-methyl-1-butene in 20 g. of benzene was slowly added with stirring to a mixture of 80 g. of benzene and 100 g. of 96% sulfuric acid in an alkylating flask. The addition took a total of 1.6 hours, the temperature of the flask being maintained at approximately 4° C. during said addition. Upon completion of the addition the contents of said flask were subsequently stirred for an additional 1.3 hours while the temperature was maintained at approximately 5° C. At the end of this time the upper layer comprising 116 g. was separated from the lower catalyst layer consisting of 108 g., washed with water, dried and subjected to fractional distillation under reduced pressure. A cut boiling in the range of from 100–101° C. at 3 mm. pressure, partly crystalline and partly liquid in nature was separated out. Filtration of the cut yielded nacreous white flakes consisting of 1,1,5,5-tetramethylhydrindacene having a melting point of 92–93° C.

I claim as my invention:

1. A process for the preparation of a substituted polynuclear hydrocarbon which comprises treating an aromatic hydrocarbon free of olefinic unsaturation and containing at least two pairs of unsubstituted adjacent carbon atoms separated by at least one carbon atom with a monohydrohalide of a conjugated aliphatic diene in which at least one of the doubly bonded carbon atoms is a tertiary carbon atom in the presence of a protonic acid catalyst selected from the group consisting of sulfuric acid, hydrogen fluoride, phosphoric acid and silica-alumina, and recovering the resultant substituted polynuclear hydrocarbon.

2. A process for the preparation of a substituted polynuclear hydrocarbon which comprises treating an aromatic hydrocarbon free of olefinic unsaturation and containing at least two pairs of unsubstituted adjacent carbon atoms separated by at least one carbon atom with a monohydrohalide of a conjugated aliphatic diene in which at least one of the doubly bonded carbon atoms is a tertiary carbon atom in the presence of a protonic acid catalyst selected from the group consisting of sulfuric acid, hydrogen fluoride, phosphoric acid and silica-alumina at a temperature in the range of from about 0° to about 200° C., and recovering the resultant polynuclear hydrocarbon.

3. A process for the preparation of a substituted polynuclear hydrocarbon which comprises treating an aromatic hydrogen free of olefinic unsaturation and containing at least two pairs of unsubstituted adjacent carbon atoms separated by at least one carbon atom with a monohydrohalide of a conjugated aliphatic diene in which at least one of the doubly bonded carbon atoms is a tertiary carbon atom in the presence of sulfuric acid catalyst at a temperature in the range of from about 0° to about +35° C., and recovering the resultant substituted polynuclear hydrocarbon.

4. A process for the preparation of a substituted polynuclear hydrocarbon which comprises treating an aromatic hydrocarbon free of olefinic unsaturation and containing at least two pairs of unsubstituted adjacent carbon atoms separated by at least one carbon atom with a monohydrohalide of a conjugated aliphatic diene in which at least one of the doubly bonded carbon atoms is a tertiary carbon atom in the presence of hydrogen fluoride at a temperature in the range of from about 0° to about +35° C., and recovering the resultant substituted polynuclear hydrocarbon.

5. A process for the preparation of a substituted polynuclear hydrocarbon which comprises treating an aromatic hydrocarbon free of olefinic unsaturation and containing at least two pairs of unsubstituted adjacent carbon atoms separated by at least one carbon atom with a monohydrohalide of a conjugated aliphatic diene in which at least one of the doubly bonded carbon atoms is a tertiary carbon atom in the presence of phosphoric acid at a temperature in the range of from about 0° to about +35° C., and recovering the resultant substituted polynuclear hydrocarbon.

6. A process for the preparation of a substituted polynuclear hydrocarbon which comprises treating an aromatic hydrocarbon free of olefinic unsaturation and containing at least two pairs of unsubstituted adjacent carbon atoms separated by at least one carbon atom with an isoprene monohydrohalide in the presence of sulfuric acid catalyst at a temperature in the range of from about 0° to about +35° C., and recovering the resultant substituted polynuclear hydrocarbon.

7. A process for the preparation of a substituted polynuclear hydrocarbon which comprises treating an aromatic hydrocarbon free of olefinic unsaturation and containing at least two pairs of unsubstituted adjacent carbon atoms separated by at least one carbon atom with an isoprene monohydrochloride in the presence of sulfuric acid catalyst at a temperature in the range of from about 0° to about +35° C., and recovering the resultant substituted polynuclear hydrocarbon.

8. A process for the preparation of a substituted polynuclear hydrocarbon which comprises treating an aromatic hydrocarbon free of olefinic unsaturation and containing at least two pairs of unsubstituted adjacent carbon atoms separated by at least one carbon atom with an isoprene monohydrobromide in the presence of sulfuric acid catalyst at a temperature in the range of from about 0° to about +35° C., and recovering the resultant polynuclear hydrocarbon.

9. A process for the preparation of 1,1,5,5-tetramethylhydrindacene which comprises treating benzene with isoprene monohydrochloride in the presence of concentrated sulfuric acid at a temperature in the range of from about 0° to about +35° C., and recovering the resultant 1,1,5,5-tetramethylhydrindacene.

10. A process for the preparation of 1,1,4,5,5-pentamethylhydrindacene which comprises treating toluene with isoprenemonohydrochloride in the presence of concentrated sulfuric acid at a temperature in the range of from about 0° to about +35° C., and recovering the resultant 1,1,4,5,5-pentamethylhydrindacene.

11. A process for the preparation of 1,1,4,5,5,8-hexamethylhydrindacene which comprises treating p-xylene with isoprene monohydrochloride in the presence of concentrated sulfuric acid at a temperature in the range of from about 0° to about +35° C., and recovering the resultant 1,1,4,5,5,8-hexamethylhydrindacene.

12. A process for the preparation of a substituted polynuclear hydrocarbon which comprises treating an aromatic hydrocarbon free of olefinic unsaturation and containing at least two pairs of unsubstituted adjacent carbon atoms separated by at least one carbon atom with a monohydrohalide of a conjugated aliphatic diene in which at least one of the doubly bonded carbon atoms is a tertiary carbon atom in the presence of a sulfuric acid catalyst and a saturated hydrocarbon solvent at a temperature in the range of from about 0° to about +200° C., and recovering the resultant substituted polynuclear hydrocarbon.

13. A process for the preparation of a substituted polynuclear hydrocarbon which comprises treating an aromatic hydrocarbon free of olefinic unsaturation and containing at least two pairs of unsubstituted adjacent carbon atoms separated by at least one carbon atom with a monohydrohalide of a conjugated aliphatic diene in which at least one of the doubly bonded carbon atoms is a tertiary carbon atom in the presence of a sulfuric acid catalyst and a paraffin at a temperature in the range of from about 0° to about +200° C., and recovering the resultant substituted polynuclear hydrocarbon.

14. A process for the preparation of a substituted polynuclear hydrocarbon which comprises treating an aromatic hydrocarbon free of olefinic unsaturation and containing at least two pairs of unsubstituted adjacent carbon atoms separated by at least one carbon atom with a monohydrohalide of a conjugated aliphatic diene in which at least one of the doubly bonded carbon atoms is a tertiary carbon atom in the presence of a sulfuric acid catalyst and a cycloparaffin at a temperature in the range of from about 0° to about +200° C., and recovering the resultant substituted polynuclear hydrocarbon.

15. A process for the preparation of a substituted polynuclear hydrocarbon which comprises treating an aromatic hydrocarbon free of olefinic unsaturation and containing at least two pairs of unsubstituted adjacent carbon atoms separated by at least one carbon atom with a monohydrohalide of a conjugated aliphatic diene in which at least one of the doubly bonded carbon atoms is a tertiary carbon atom in the presence of a sulfuric acid catalyst and methylcyclohexane at a temperature in the range of from about 0° to about +200° C., and recovering the resultant substituted polynuclear hydrocarbon.

16. A process for the preparation of 1,1,5,5-tetramethylhydrindacene which comprises treating benzene with isoprene monohydrochloride in the presence of a solvent consisting of methylcyclohexane and a catalyst consisting of concentrated sulfuric acid at a temperature in the range of from about 0° to about +35° C., and recovering the resultant 1,1,5,5-tetramethylhydrindacene.

17. A process for the preparation of 1,1,3,3,5,5,7,7-octamethylhydrindacene which comprises treating benzene with 4-chloro-2,4-dimethylpentene-2 in the presence of a solvent consisting of methycyclohexane and a catalyst consisting of concentrated sulfuric acid at a temperature in the range of from about 0° to about +35° C., and recovering the resultant 1,1,3,3,5,5,7,7-octamethylhydrindacene.

References Cited in the file of this patent

UNITED STATES PATENTS

| 2,752,403 | Schultze et al. | June 26, 1956 |
| 2,768,982 | Schlatter et al. | Oct. 30, 1956 |

FOREIGN PATENTS

| 646,214 | Great Britain | Nov. 15, 1950 |

OTHER REFERENCES

Isogulyants et al.: Compte rendu acad. Sci. U. R. S. S., vol. 56, pages 165–8 (1947).

Losev et al.: Zhur, Obshchei Khim, vol. 21 pages 668–676 (1951) (abstracted in Chemical Abstracts, vol. 45, page 9491d).